US012471523B2

(12) United States Patent
Sugino

(10) Patent No.: US 12,471,523 B2
(45) Date of Patent: Nov. 18, 2025

(54) ARITHMETIC DEVICE AND WORK MACHINE

(71) Applicant: HONDA MOTOR CO., LTD., Tokyo (JP)

(72) Inventor: Tsukasa Sugino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 888 days.

(21) Appl. No.: 17/702,943

(22) Filed: Mar. 24, 2022

(65) Prior Publication Data

US 2022/0312670 A1    Oct. 6, 2022

(30) Foreign Application Priority Data

Mar. 30, 2021  (JP) ................................. 2021-058440

(51) Int. Cl.
*A01D 34/00*    (2006.01)
*G05D 1/00*    (2006.01)
*A01D 101/00*    (2006.01)

(52) U.S. Cl.
CPC ......... *A01D 34/008* (2013.01); *G05D 1/0219* (2013.01); *G05D 1/0274* (2013.01); *G05D 1/0295* (2013.01); *A01D 2101/00* (2013.01)

(58) Field of Classification Search
CPC ............. A01D 34/008; A01D 2101/10; G05D 1/0219; G05D 1/0274; G05D 1/0295
See application file for complete search history.

(56) References Cited

U.S. PATENT DOCUMENTS

| 6,148,255 | A  | 11/2000 | Van Der Lely |
| 6,587,772 | B2 | 7/2003  | Behnke |
| 6,732,024 | B2 | 5/2004  | Wilhelm Rekow et al. |
| 8,738,238 | B2 | 5/2014  | Rekow |
| 9,839,174 | B2 | 12/2017 | Fujimoto et al. |

(Continued)

FOREIGN PATENT DOCUMENTS

| DE | 10064860 A1  | 6/2002 |
| JP | 2001-507843 A | 6/2001 |
| JP | 2018-117313 A | 7/2018 |

OTHER PUBLICATIONS

Non-Final Office Action for U.S. Appl. No. 17/702,937 mailed on Feb. 22, 2024 (Related Case).

(Continued)

*Primary Examiner* — Adnan M Mirza
(74) *Attorney, Agent, or Firm* — Thomas Horstemeyer, LLP

(57) ABSTRACT

An arithmetic device configured to perform an arithmetic process on a travel route for each of a plurality of work machines capable of conducting a work in a work region, the device comprising an acquisition unit for acquiring map information of the work region, and a setting unit for setting, for each work machine, a work start point, a work end point, and at least one intermediate point on an outer edge portion of the work region, and for setting, on the map information, the travel route from the work start point to the work end point to pass through the at least one intermediate point, wherein the travel route has a predetermined width, and a plurality of travel routes respectively corresponding to the plurality of work machines enclose the work region with the predetermined width.

7 Claims, 9 Drawing Sheets

(56) References Cited

U.S. PATENT DOCUMENTS

| | | |
|---|---|---|
| 10,254,765 B2 | 4/2019 | Rekow |
| 10,875,404 B2 | 12/2020 | Shinkai et al. |
| 10,962,987 B2 | 3/2021 | Suzuki et al. |
| 11,029,681 B2 | 6/2021 | Rulseh et al. |
| 11,169,279 B2 | 11/2021 | Shinkai et al. |
| 11,366,481 B2 | 6/2022 | Nguyen et al. |
| 11,591,757 B2 | 2/2023 | O'Donnell |
| 11,708,094 B2 | 7/2023 | Creaby et al. |
| 2002/0082757 A1 | 6/2002 | Behnke |
| 2002/0165649 A1 | 11/2002 | Wilhelm Rekow et al. |
| 2011/0112730 A1 | 5/2011 | Rekow |
| 2014/0257619 A1 | 9/2014 | Rekow |
| 2016/0120095 A1 | 5/2016 | Fujimoto et al. |
| 2018/0208059 A1 | 7/2018 | Shinkai et al. |
| 2018/0210092 A1 | 7/2018 | Shinkai et al. |
| 2018/0338408 A1* | 11/2018 | Shinkai ................ G05D 1/0287 |
| 2019/0302783 A1* | 10/2019 | Morwood ............ G05D 1/0274 |
| 2019/0310656 A1 | 10/2019 | Suzuki et al. |
| 2019/0339690 A1 | 11/2019 | Kwak et al. |
| 2020/0285228 A1 | 9/2020 | Rulseh et al. |
| 2020/0332479 A1 | 10/2020 | O'Donnell |
| 2021/0395978 A1 | 12/2021 | Takaoka |
| 2022/0011780 A1 | 1/2022 | Nguyen et al. |
| 2022/0204052 A1 | 6/2022 | Creaby et al. |
| 2022/0276660 A1 | 9/2022 | Kwak |
| 2022/0290402 A1 | 9/2022 | Okada et al. |

OTHER PUBLICATIONS

Final Office Action for U.S. Appl. No. 17/702,937 mailed on Jul. 9, 2024 (Related Case).

File history of related U.S. Appl. No. 17/702,937, filed Mar. 24, 2022 (Related Case).

German Office Action for German Patent Application No. 102022107041.7 mailed Jan. 24, 2023 (partially translated).

* cited by examiner

ARITHMETIC DEVICE AND WORK MACHINE

CROSS-REFERENCE TO RELATED APPLICATION(S)

This application claims priority to and the benefit of Japanese Patent Application No. 2021-058440 filed on Mar. 30, 2021 the entire disclosure of which is incorporated herein by reference.

BACKGROUND OF THE INVENTION

Field of the Invention

The present invention mainly relates to a work machine.

Description of the Related Art

Japanese Patent Laid-Open No. 2018-117313 and Japanese Patent Laid-Open No. 2001-507843 disclose a work system in which one (a master work machine) of a plurality of work machines conducts travel control for the other work machine (a slave work machine) so that the plurality of work machines conduct a predetermined work in cooperation.

In the above-described system, in general, in order to improve work efficiency in a work region, there is a demand for setting travel routes of the individual work machines and causing the corresponding work machine to travel along the travel route that has been set with high accuracy.

The present invention achieves improvements in the work efficiency relatively easily in a system in which a plurality of work machines conduct a work in cooperation.

SUMMARY OF THE INVENTION

One of the aspects of the present invention provides an arithmetic device configured to perform an arithmetic process on a travel route for each of a plurality of work machines capable of conducting a work in a work region, the arithmetic device comprising an acquisition unit configured to acquire map information of the work region, and a setting unit configured to set, for each of the plurality of work machines, a work start point, a work end point, and at least one intermediate point between the work start point and the work end point on an outer edge portion of the work region, and configured to set, on the map information, the travel route from the work start point to the work end point to pass through the at least one intermediate point, wherein the travel route has a predetermined width, and a plurality of travel routes respectively corresponding to the plurality of work machines enclose the work region with the predetermined width.

Further features of the present invention will become apparent from the following description of exemplary embodiments with reference to the attached drawings.

DESCRIPTION OF THE EMBODIMENTS

Figure 1:
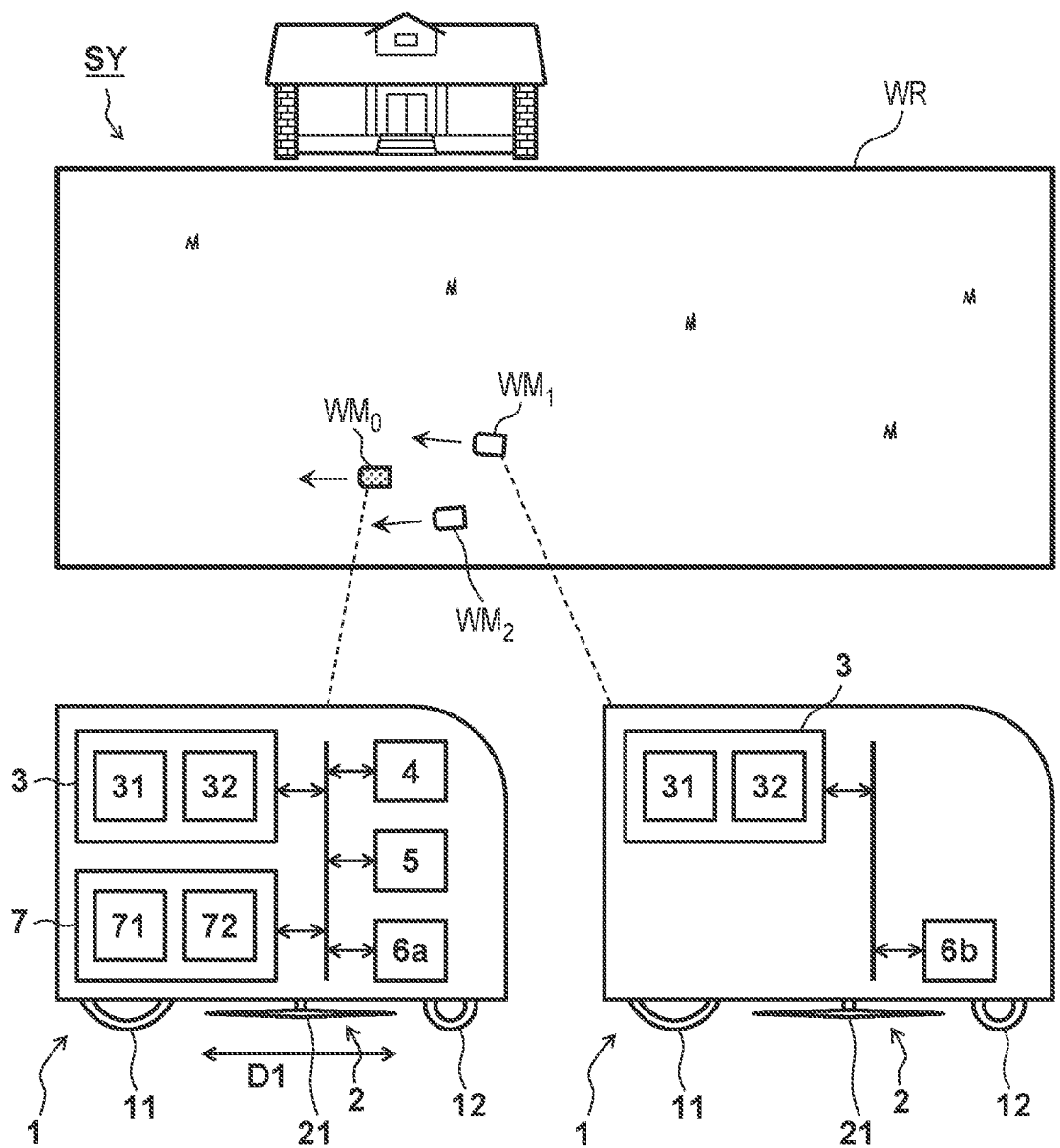
FIG. 1 illustrates a configuration example of a work system according to an embodiment.

Hereinafter, embodiments will be described in detail with reference to the accompanying drawings. Note that the following embodiments do not limit the invention according to the claims, and not all combinations of features described in the embodiments are essential to the invention. Two or more of a plurality of the features described in the embodiments may be optionally combined together. In addition, identical or similar configurations are denoted by identical reference numerals, and overlapping descriptions will be omitted.

(System Configuration)

FIG. 1 illustrates a configuration example of a work system SY according to an embodiment. The work system SY includes a plurality of work machines WM, and three work machines WM are provided in the present embodiment, but the number of the work machines WM is not limited to the present example. Each work machine WM is a self-propelled (unmanned traveling) lawn mower. One of the plurality of work machines WM functions as a master work machine $WM_0$, and the other work machines WM function as slave work machines $WM_1$ and $WM_2$. The master work machine $WM_0$ is capable of outputting a signal to the slave work machines $WM_1$ and $WM_2$, and such a signal includes a travel instruction for conducting travel control for the slave work machines $WM_1$ and $WM_2$ in the present embodiment. Each of the slave work machines $WM_1$ and $WM_2$ receives the travel instruction from the master work machine $WM_0$, and travels based on the travel instruction (hereinafter, simply referred to as a "travel instruction" in some cases).

Although details will be described later, with such a configuration, the master work machine $WM_0$ outputs the travel instruction to the slave work machines $WM_1$ and $WM_2$ to conduct the work in a work region WR1 in cooperation with the slave work machines $WM_1$ and $WM_2$. Here, the work region WR1 having a rectangular shape is illustrated for facilitating the understanding, but the work region WR1 may have any shape, as will be described later.

(Configuration of Master Work Machine)

As illustrated in FIG. 1, the master work machine $WM_0$ includes a travel unit 1, a work unit 2, a drive unit 3, a self-work machine position specifying unit 4, another work machine detection unit 5, a transmission unit 6a, and a system controller 7.

The travel unit 1 causes the vehicle body of the master work machine $WM_0$ to travel. In the present embodiment, the travel unit 1 includes a pair of left and right driving wheels 11 and a pair of left and right driven wheels 12. For example, when the pair of left and right driving wheels 11 rotate in one direction (a direction to move forward) at the same rotation speed with each other, the master work machine $WM_0$ is capable of traveling straight. In addition, when the pair of left and right driving wheels 11 rotate in the other direction (a direction to move rearward) at the same rotation speed with each other, the master work machine $WM_0$ is capable of moving rearward. When the pair of left and right driving wheels 11 rotate in one direction at different rotation speeds from each other, the master work machine $WM_0$ is capable of turning to the left or right. When the pair of left and right driving wheels 11 rotate in different directions from each other at the same rotation speed with each other, the master work machine $WM_0$ is also capable of making a spin turn.

The work unit 2 is configured to be capable of achieving a predetermined work, which is a lawn mowing work in the present embodiment. The work unit 2 includes a lawn mowing blade 21, and conducts the lawn mowing work with rotations of the blade 21. Although details will be described later, the blade 21 has a substantially circular shape, and its diameter corresponds to a work width D1.

The drive unit 3 drives the travel unit 1 and the work unit 2. Specifically, the drive unit 3 includes a traveling driver 31 that individually rotates the pair of left and right driving wheels 11, and a work driver 32 that rotates the blade 21. The work driver 32 is configured to be capable of lifting up and down the blade 21, lifts down the blade 21 to rotate at the time of conducting the work, and lifts up the blade 21 to stop its rotation at the time of not conducting the work.

The self-work machine position specifying unit 4 is configured to be capable of specifying the position of the self-work machine (the master work machine $WM_0$). A global positioning system (GPS) sensor can be typically used as the self-work machine position specifying unit 4. As another embodiment, the position of the self-work machine may be specified or estimated from a relative positional relationship between a point group of light detection and ranging (LiDAR) and the master work machine $WM_0$. In this manner, the self-work machine position specifying unit 4 acquires position coordinates for specifying the position of the master work machine $WM_0$. The position coordinates are typically expressed using latitude and longitude, but as another example, may be expressed by X-Y coordinates, or may be expressed by X-Y-Z coordinates in consideration of a difference in height.

The another work machine detection unit 5 is configured to be capable of detecting a relative position of another work machine (the slave work machines $WM_1$ and $WM_2$) with respect to the self-work machine (the master work machine $WM_0$). For the another work machine detection unit 5, a distance measuring device for measuring a distance and a direction to a target object is used, and in the present embodiment, a camera typically a compound-eye camera is used. In this manner, the another work machine detection unit 5 detects and acquires the relative positions of the slave work machines $WM_1$ and $WM_2$ with respect to the master work machine $WM_0$. As another embodiment, a radar (a millimeter wave radar) and/or a light detection and ranging (LiDAR) may be used as the another work machine detection unit 5.

Although details will be described later, in the present embodiment, the slave work machines $WM_1$ and $WM_2$ respectively follow rear lateral sides of the master work machine $WM_0$, the another work machine detection unit 5 is attached to be capable of detecting a situation behind the vehicle body of the master work machine $WM_0$. As another embodiment, the slave work machines $WM_1$ and $WM_2$ may precede ahead the master work machine $WM_0$, and in such a case, the another work machine detection unit 5 can be attached to be capable of detecting the situation ahead the vehicle body of the master work machine $WM_0$.

The transmission unit 6a transmits a travel instruction to each of the slave work machines $WM_1$ and $WM_2$. Each of the slave work machines $WM_1$ and $WM_2$ receives the travel instruction by a reception unit 6b to be described later. Note that a transmission and reception unit may be used for each of the transmission unit 6a and the reception unit 6b so that the master work machine $WM_0$ and the slave work machines $WM_1$ and $WM_2$ are capable of communicating with each other.

The system controller 7 functions as an arithmetic device for controlling the entire system of the master work machine $WM_0$, and conducts drive control for the individual component elements described above. The system controller 7 includes a central processing unit (CPU) 71 and a memory 72, and the CPU 71 performs an arithmetic process to be described later by developing a predetermined program on the memory 72 and executing the program. The system controller 7 may be configured with a semiconductor device including a processing circuit such as an application specific integrated circuit (ASIC). That is, the function of the system controller 7 is achievable by either hardware or software.

(Configuration of Slave Work Machine)

As illustrated in FIG. 1, each of the slave work machines $WM_1$ and $WM_2$ includes a travel unit 1, a work unit 2, and a drive unit 3, similarly to the master work machine $WM_0$, and further includes a reception unit 6b. The reception unit 6b is capable of receiving the travel instruction that has been transmitted from the transmission unit 6a of the master work machine $WM_0$. Accordingly, each of the slave work machines $WM_1$ and $WM_2$ receives the travel instruction from the master work machine $WM_0$.

With such a configuration, the slave work machines $WM_1$ and $WM_2$ travel together with the master work machine $WM_0$, based on the travel instruction that has been received from the master work machine $WM_0$, and conducts the work in the work region WR1. It is assumed that the travel unit 1, the work unit 2, and the drive unit 3 in each of the slave work machines $WM_1$ and $WM_2$ respectively have functions almost the same with those of the travel unit 1, the work unit 2, and the drive unit 3 of the master work machine $WM_0$, that is, the slave work machines $WM_1$ and $WM_2$ each have work capabilities almost the same with those of the master work machine $WM_0$. In the present embodiment, the slave work machines $WM_1$ and $WM_2$ respectively travel to follow the rear lateral sides of the master work machine $WM_0$ at the same speeds as the master work machine $WM_0$. Therefore, in regions of the work widths D1 through which the respective work machines WM have passed, the work becomes completed. As another embodiment, the master work machine $WM_0$ and the slave work machines $WM_1$ and $WM_2$ may have different work widths D1 from one another, but the traveling speeds of the master work machine $WM_0$ and the slave work machines $WM_1$ and $WM_2$ are desirably equal to one another.

Note that each of the slave work machines $WM_1$ and $WM_2$ may include the self-work machine position specifying unit 4, the another work machine detection unit 5, the transmission unit 6a, and the system controller 7 similarly to the master work machine $WM_0$. However, it is assumed that these units are not included in the present embodiment. The master work machine $WM_0$ may be expressed as a main work machine, a master, a leader, or the like, and each of the slave work machines $WM_1$ and $WM_2$ may be expressed as a sub work machine, a slave, a follower, or the like.

(Method for Conducting Work)

Figure 2:
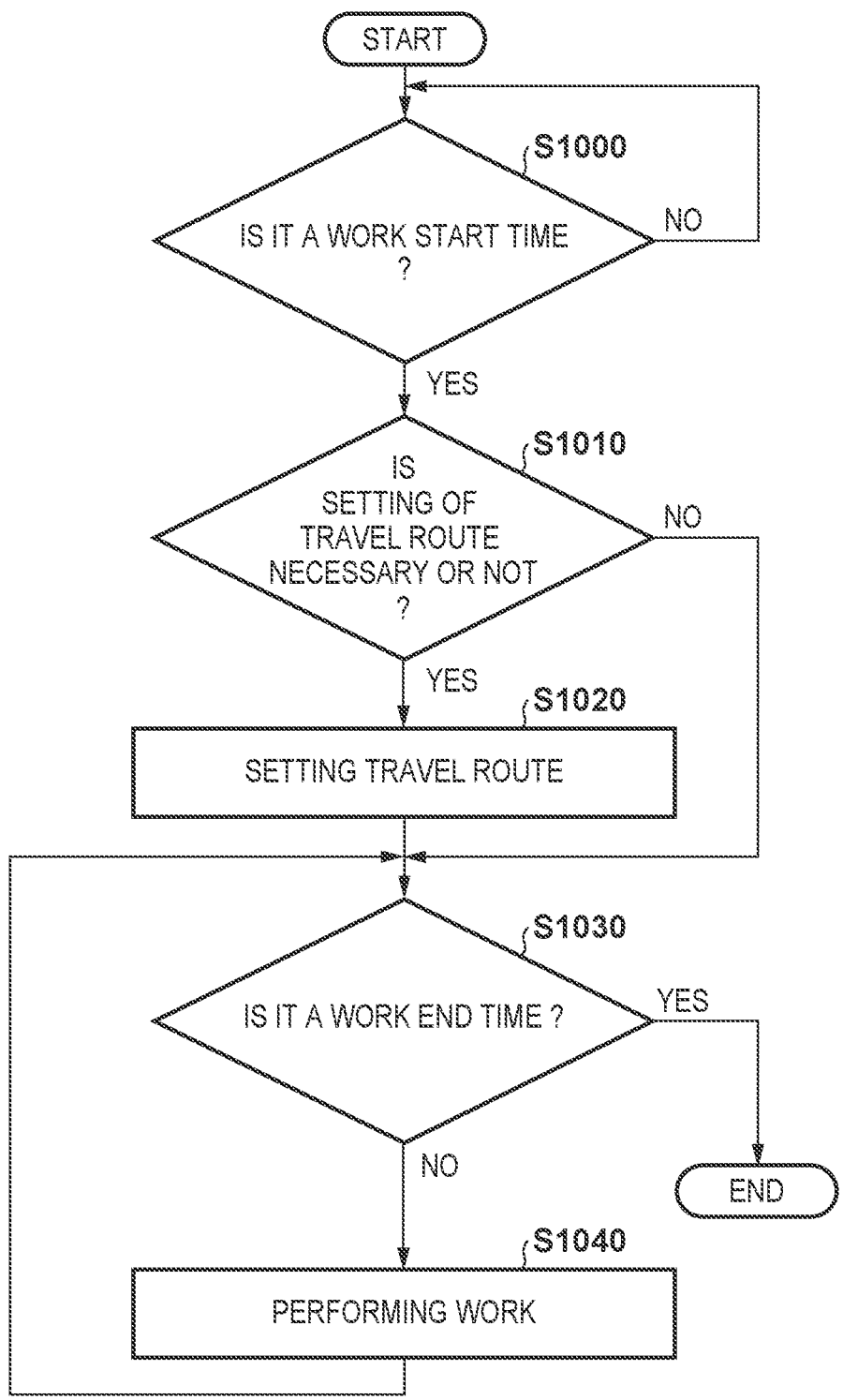
FIG. 2 is a flowchart illustrating an example of a work execution method by the work system.

FIG. 2 is a flowchart illustrating a method for conducting a work by the work system SY. The present flowchart is mainly performed by the system controller 7, and its content is to set a plurality of travel routes $R1_0$, $R1_1$, and $R1_2$ (see FIG. 4) and to cause the plurality of work machines $WM_0$, $WM_1$, and $WM_2$ to travel, based on the travel routes. The plurality of travel routes $R1_0$, $R1_1$, and $R1_2$ are set to respectively correspond to the plurality of work machines $WM_0$, $WM_1$, and $WM_2$, and will be simply expressed as a travel route R1, unless otherwise distinguished in the following description.

In step S1000 (hereinafter, simply referred to as "S1000". The same applies to other steps to be described later), whether it is a work start time is determined. In a case where it is the work start time (in a case of Yes determination), the process proceeds to S1010, and in the other case (in a case of No determination), the process returns to S1000. The work start time can be set beforehand by a user. The user mentioned here is typically the owner of the work system SY, but may be another person who temporarily uses the work system SY. Note that, in S1000, it can be said that the CPU 71 functions as a determination unit.

In S1010, it is determined whether the setting of the travel route R1 is necessary. In a case where the setting of the travel route R1 is necessary (in a case of Yes determination), the process proceeds to S1020, and in a case where the setting of the travel route R1 is unnecessary (in a case of No determination), the process proceeds to S1030. Examples of the case where the setting of the travel route R1 is necessary include a case where the travel route R1 has not been set yet, a case where the travel route R1 has already been set but has to be updated, and the like. Examples of the case where the setting of the travel route R1 is unnecessary include a case where the travel route R1 has already been set and does not have to be updated. Note that, in S1010, it can be said that the CPU 71 functions as the determination unit.

In S1020, the travel route R1 (each of the plurality of travel routes $R1_0$, $R1_1$, and $R1_2$) is set. Its details will be described later. Note that, in S1020, it can be said that the CPU 71 functions as a setting unit.

In S1030, it is determined whether it is a work end time. In a case where it is the work end time (in a case of Yes determination), the present flowchart is ended, and in the other case (in a case of No determination), the process proceeds to S1040. The work end time can be set beforehand by the user. Note that, in S1030, it can be said that the CPU 71 functions as the determination unit.

In S1040, the drive control for the plurality of work machines WM is conducted, and a work in the work region WR1 is conducted. Its details will be described later. Note that, in S1040, it can be said that the CPU 71 functions as a work execution instruction unit.

(Method for Setting Travel Route)

Figure 3:
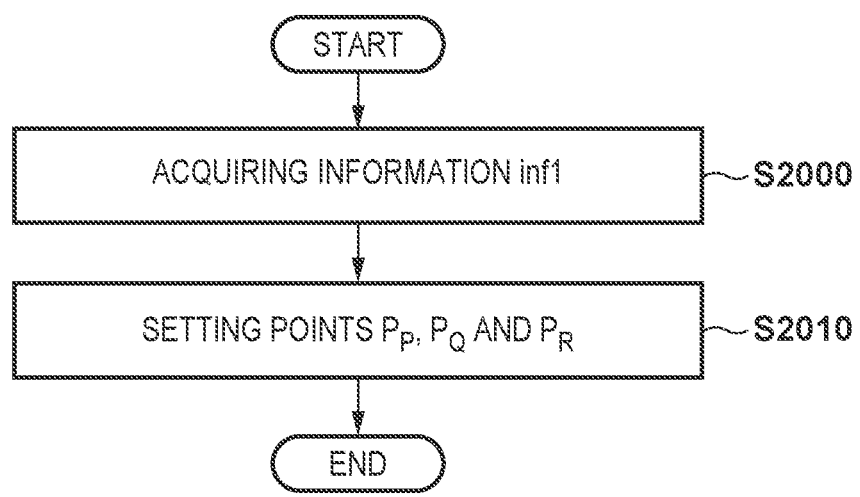
FIG. 3 is a flowchart illustrating an example of a method for setting a travel route.

FIG. 3 is a flowchart illustrating contents of S1020 (a method for setting a plurality of travel routes $R1_0$, $R1_1$, and $R1_2$). The outline of the present flowchart is that the plurality of travel routes $R1_0$, $R1_1$, and $R1_2$ are set to form reciprocation routes for reciprocating between one side and the other side of the work region WR1 (see FIG. 4).

In S2000, map information inf1 of the work region WR1 is acquired. The map information inf1 may be acquired by being stored in the memory 72 beforehand and read from the memory 72, or may be acquired from a predetermined server through a network. Note that, in S2000, it can be said that the CPU 71 functions as an acquisition unit.

In S2010, a work start point $P_P$, a work end point $P_Q$, and one or more intermediate points $P_R$ between them are set on the map information inf1, and the travel route R1 from the work start point $P_P$ to the work end point $P_Q$ is set to pass through the intermediate point $P_R$. Note that, in S2010, it can be said that the CPU 71 functions as the setting unit.

The work start point $P_P$, the work end point $P_Q$, and the intermediate point $P_R$ are set in outer edge portions of the work region WR1 for each of the plurality of work machines WM. Here, the work region WR1 has a rectangular shape, and the work start point $P_P$, the work end point $P_Q$, and the intermediate point $P_R$ are respectively set on two side portions facing each other in the work region WR1. Accordingly, the individual travel routes R1 are respectively set to form reciprocation routes r1_1 and the like for the corresponding work machines WM to reciprocate between one side (a side portion E1) and the other side (a side portion E2) in the work region WR1.

Here, it is assumed that N reciprocation routes are formed, where N is an integer of 3 or more. A first reciprocation route, a second reciprocation route, . . . , and an Nth reciprocation route are respectively indicated as a reciprocation route r1_1, a reciprocation routes r1_2, . . . , and a reciprocation route r1_N, in the drawing. In addition, in a case where K is any integer of 1 to N, Kth reciprocation routes r1_K respectively corresponding to the master work machine $WM_0$, the slave work machine $WM_1$, and the slave work machine $WM_2$ are indicated by reciprocation routes r10_K, r11_K, and r12_K. The intermediate point $P_R$ corresponds to a turnaround point of the reciprocation route, and its number is $(N-1) \times 2$.

Note that a travel route connecting between two continuous reciprocation routes is defined as a turnaround route r2, and the turnaround routes r2 of the plurality of work machines WM are illustrated not to overlap each other for easy viewing. However, the turnaround routes r2 may desirably overlap each other.

Figure 4:
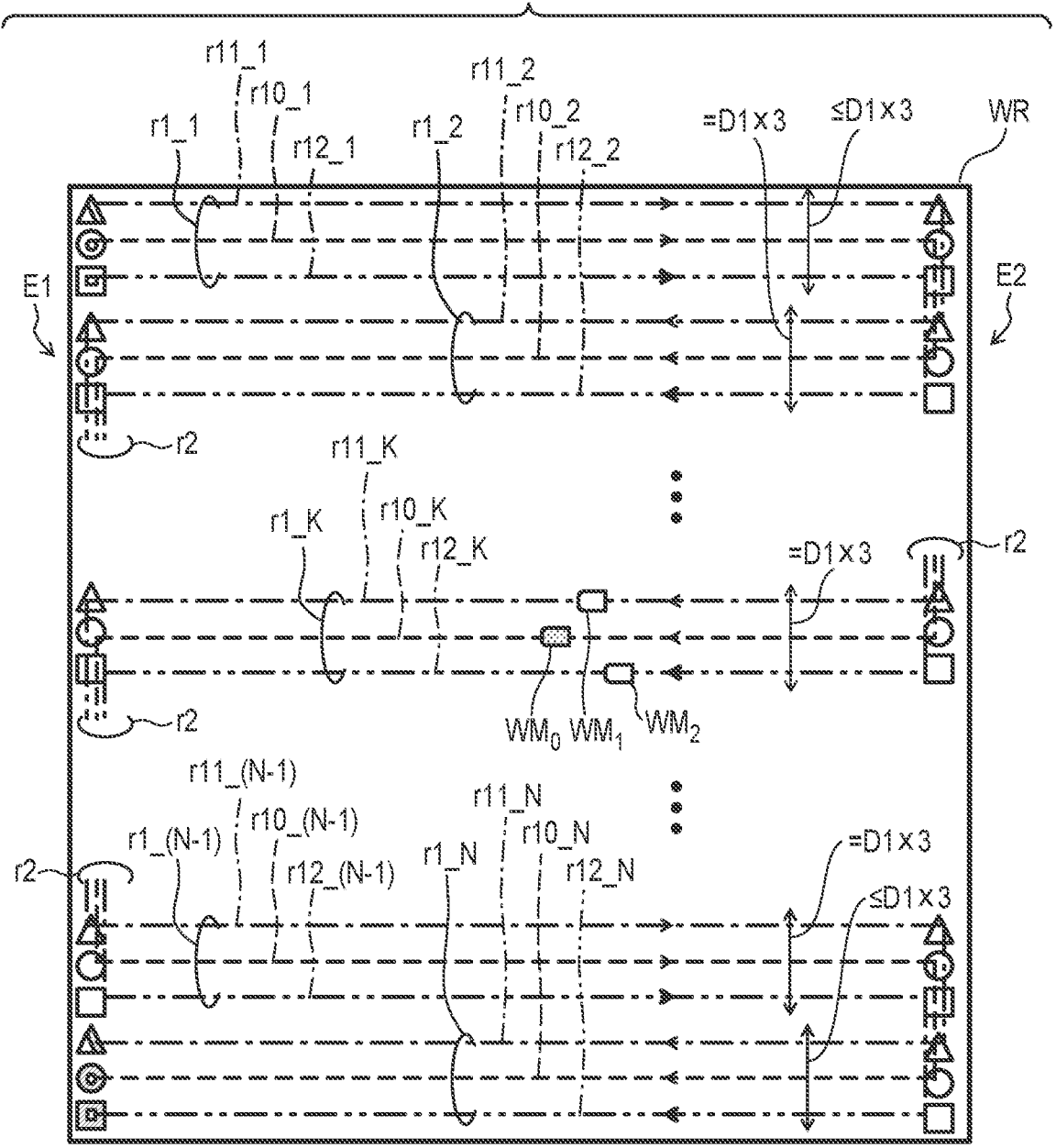
FIG. 4 is a diagram illustrating an example of the travel route that has been set in a work region.

As illustrated in FIG. 4, regarding the work start point $P_P$,
a work start point $P0_P$ is indicated to correspond to the master work machine $WM_0$,
a work start point $P1_P$ is indicated to correspond to the slave work machine $WM_1$, and
a work start point $P2_P$ is indicated to correspond to the slave work machine $WM_2$.

In addition, regarding the work end point $P_Q$,
a work end point $P0_Q$ is indicated to correspond to the master work machine $WM_0$,
a work end point $P1_Q$ is indicated to correspond to the slave work machine $WM_1$, and
a work end point $P2_Q$ is indicated to correspond to the slave work machine $WM_2$.

Further, regarding the intermediate point $P_R$,
an intermediate point $P0_R$ is indicated to correspond to the master work machine $WM_0$,
an intermediate point $P1_R$ is indicated to correspond to the slave work machine $WM_1$, and
an intermediate point $P2_R$ is indicated to correspond to the slave work machine $WM_2$. Here, for convenience of description, in a case where m is any integer of 1 to $(N-1) \times 2$, the intermediate points $P_{R\_m}$ corresponding to the master work machine $WM_0$, the slave work machine $WM_1$, and the slave work machine $WM_2$ can be respectively indicated by intermediate points $P0_R\_m$, $P1_R\_m$, and $P2_R\_m$.

According to the present flowchart, the plurality of travel routes $R1_0$, $R1_1$, and $R1_2$ can be set on the map information inf1 so as to respectively form the reciprocation routes r10_K, r11_K, and r12_K (K is any integer of 1 to N). The reciprocation routes r10_K, r11_K, and r12_K each have the work width D1. Thus, the width of the reciprocation route r1_K formed by them may be preferably set to $D1 \times 3$. It would be sufficient if it is set to D1×3 or smaller depending on the size of the work region WR1.

In the present embodiment, the width of the reciprocation route r1_K can be set to D1×3 for K=2 to (N−1), and can be set to D1×3 or smaller for K=1 and/or K=N.

In the example of FIG. 4, a direction of the reciprocation route r1_K is defined as a reciprocation direction, a direction intersecting (substantially orthogonal to) the reciprocation direction is defined as a turnaround direction, and L1 is defined as a size of the turnaround direction in the work region WR1. In this situation, it would be sufficient if the excess of L1÷(D1×3) is conducted by one or both of the reciprocation routes r1_1 and r1_N. In the present example, it is assumed that the work start point $P_P$ and the work end point $P_Q$ are both set in the side portion E1 of the work region WR1. The work start point $P_P$ and the work end point $P_Q$ may be set to any of the side portions E1 and E2, or may be fixedly set to one of the side portions E1 and E2. According to such an aspect, in both of the reciprocation routes r1_1 and r1_N, the work may be conducted with a work width smaller than D1×3.

According to the above-described method, the travel route R1 has a predetermined width, and the plurality of travel routes $R1_0$, $R1_1$, and $R1_2$ respectively corresponding to the plurality of work machines $WM_0$, $WM_1$, and $WM_2$ can be set to enclose the work region WR1 with their widths. In this case, parts where the plurality of travel routes $R1_0$, $R1_1$, and $R1_2$ overlap each other exist only on the side portions E1 and E2 in the work region WR1, and in addition, the work can be uniformly conducted for the entire work region WR1, and the work efficiency in the work region WR1 can be improved.

Note that here, the work region WR1 has a rectangular shape for facilitating the understanding. In this case, the above-described reciprocation routes are set so that their directions are parallel to each other. Although details will be described later, the contents of the present example are also applicable to the work region WR1 having another shape.

(Regarding Drive Control for a Plurality of Work Machines in Conducting Work in Work Region)

Figure 5:
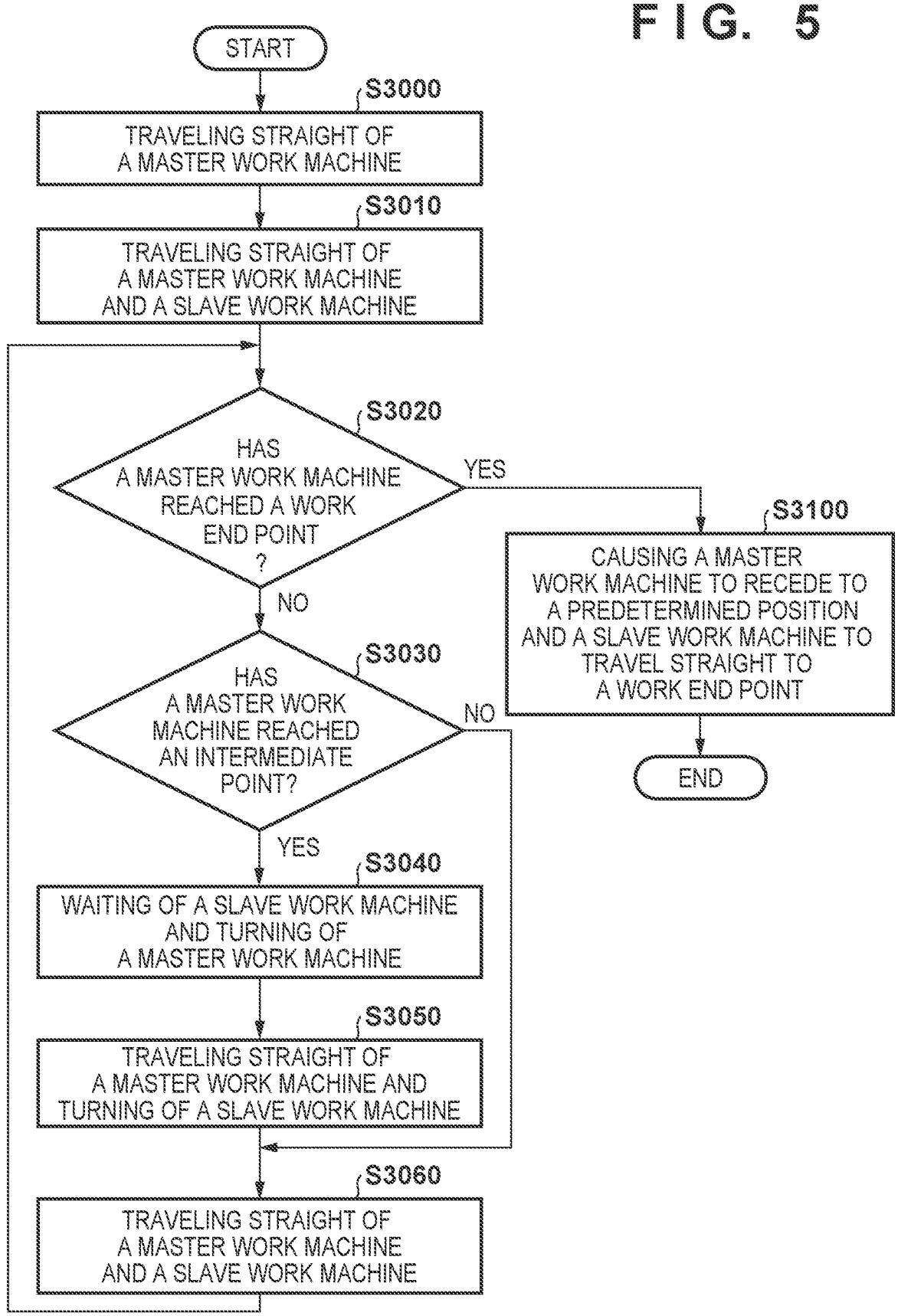
FIG. 5 is a flowchart illustrating an example of a method for conducting drive control for work machines.

FIG. 5 is a flowchart illustrating contents of S1040 (a method for conducting drive control for the plurality of work machines WM). The outline of the present flowchart is to conduct the travel control for each of the plurality of work machines $WM_0$, $WM_1$, and $WM_2$ so that the slave work machines $WM_1$ and $WM_2$ respectively follow the rear lateral sides of the master work machine $WM_0$.

In S3000, the master work machine $WM_0$ is caused to travel, while the slave work machines $WM_1$ and $WM_2$ are caused to stop. The travel control for the master work machine $WM_0$ is conducted, based on the travel route $R1_0$. The work unit 2 of the master work machine $WM_0$ is driven together with the travel unit 1 of the master work machine $WM_0$. Note that, in S3000, it can be said that the CPU 71 functions as a control unit (alternatively, a travel control unit, a travel instruction unit, or the like).

In S3010, after the master work machine $WM_0$ precedes the slave work machines $WM_1$ and $WM_2$ by a predetermined distance, the slave work machines $WM_1$ and $WM_2$ are caused to start traveling. The travel control for the slave work machine $WM_1$ is conducted, based on the travel route $R1_1$, and the travel control for the slave work machine $WM_2$ is conducted, based on the travel route $R1_2$. The work units 2 of the slave work machines $WM_1$ and $WM_2$ are respectively driven together with the travel units 1 of the slave work machines $WM_1$ and $WM_2$. Note that, in S3010, it can be said that the CPU 71 functions as the control unit.

As described above, the travel control for the slave work machines $WM_1$ and $WM_2$ is achieved by the travel instruction from the master work machine $WM_0$. Therefore, it would be sufficient if the positions where the slave work machine $WM_1$ and the slave work machine $WM_2$ start traveling in S3010 are positions capable of receiving at least the travel instruction from the master work machine $WM_0$ that is traveling. In addition, although details will be described later, the travel instruction can be corrected, based on a specification result of the self-work machine position specifying unit 4 and a detection result of the another work machine detection unit 5.

In S3020, it is determined whether the master work machine $WM_0$ has reached the work end point $P0_Q$. In a case where the master work machine $WM_0$ has reached the work end point $P0_Q$ (in a case of Yes determination), the process proceeds to S3100, and in the other case (in a case of No determination), the process proceeds to S3030. Note that, in S3020, it can be said that the CPU 71 functions as the determination unit.

In S3030, it is determined whether the master work machine $WM_0$ has reached the intermediate point $P0_R$. In a case where the master work machine $WM_0$ has reached the intermediate point $P0_R$ (in a case of Yes determination), the process proceeds to S3040, and in the other case (in a case of No determination), the process proceeds to S3060 (although details will be described later, the travel control for the work machines $WM_0$, $WM_1$, and $WM_2$ is maintained). Note that, in S3030, it can be said that the CPU 71 functions as the determination unit.

Figure 6A:
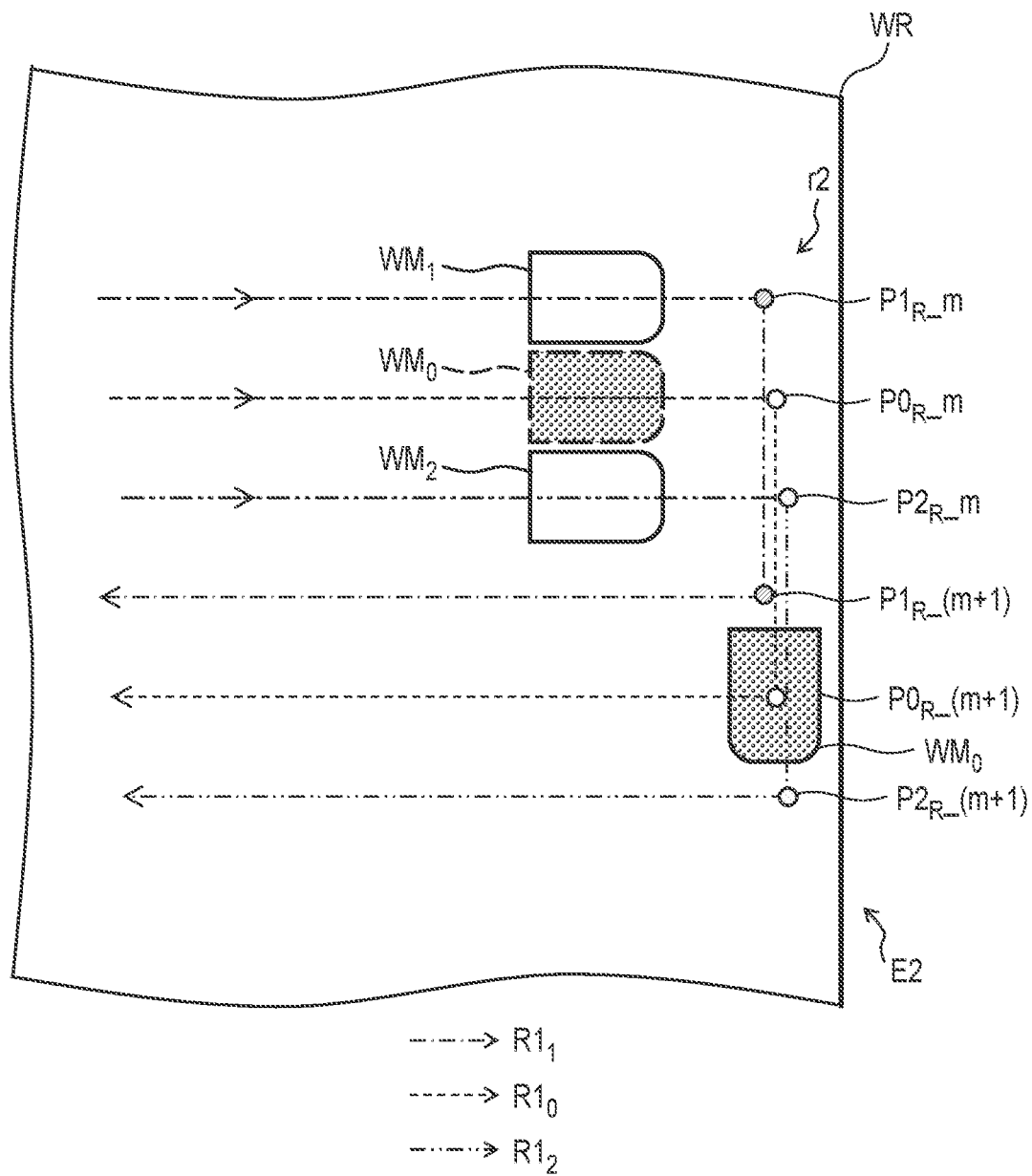
FIG. 6A is a diagram illustrating an example of the travel control for the work machines.

In S3040, while the slave work machines $WM_1$ and $WM_2$ are respectively caused to wait temporarily before the intermediate points $P1_R$ and $P2_R$, the master work machine $WM_0$ is caused to turn at the intermediate point $P0_R$ (for example, $P0_R\_m$), and is then caused to travel to the next intermediate point $P0_R$ (for example, $P0_R\_(m+1)$) (see FIG. 6A). It would be sufficient if the waiting positions of the slave work machines $WM_1$ and $WM_2$ are positions where they are capable of receiving at least the travel instruction from the master work machine $WM_0$ that is traveling, and where the master work machine $WM_0$ does not interfere with the slave work machine $WM_1$ or $WM_2$. Note that, in S3040, it can be said that the CPU 71 functions as the control unit.

Figure 6B:
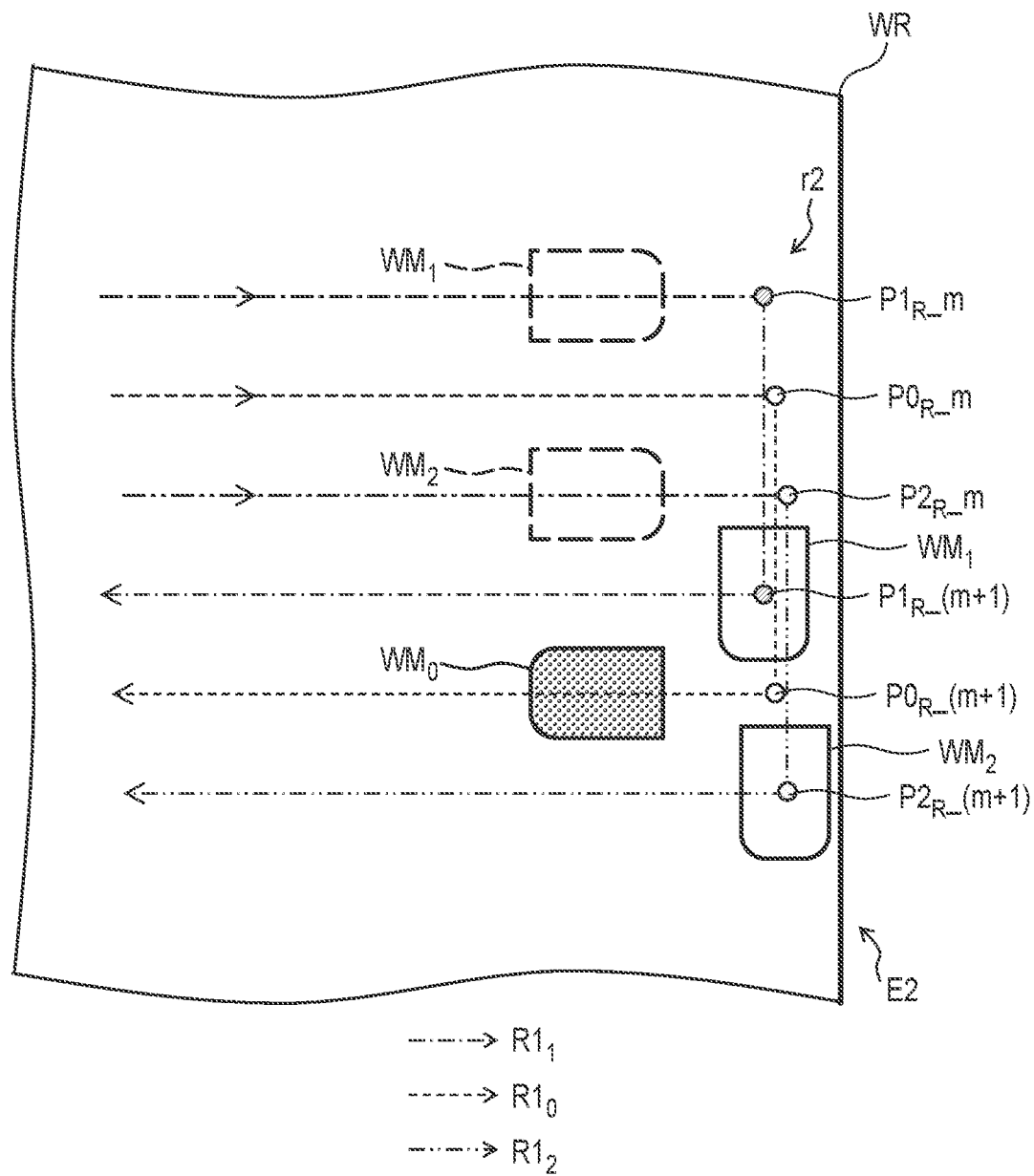
FIG. 6B is a diagram illustrating another example of the travel control for the work machines.

In S3050, the master work machine $WM_0$ is caused to turn to travel along the travel route $R1_0$ (see FIG. 6B). At substantially the same time, the slave work machine $WM_1$ is caused to travel to the intermediate point $P1_R$ (for example, $P1_R\_M$), is caused to turn, and is then caused to travel to the next intermediate point $P1_R$ (for example, $P1_R\_(m+1)$). In addition, at substantially the same time, the slave work machine $WM_2$ is caused to travel to the intermediate point $P2_R$ (for example, $P2_R\_m$), is caused to turn, and is then caused to travel to the next intermediate point $P2_R$ (for example, $P2_R\_(m+1)$). After the master work machine $WM_0$ precedes the intermediate point $P0_R$ by a predetermined distance, the travel control for the slave work machines $WM_1$ and $WM_2$ may be conducted, so that the master work machine $WM_0$ and the slave work machines $WM_1$ and $WM_2$ do not interfere with one another. In addition, the travel control for the slave work machines $WM_1$ and $WM_2$ may be conducted so that the slave work machines $WM_1$ and $WM_2$ do not interfere with each other, or may be conducted sequentially or substantially simultaneously. Note that, in S3050, it can be said that the CPU 71 functions as the control unit.

In S3060, the work machines $WM_0$, $WM_1$, and $WM_2$ are respectively caused to travel, based on the travel routes $R1_0$, $R1_1$, and $R1_2$, and the process returns to S3020 (that is, the travel control for the work machines $WM_0$, $WM_1$, and $WM_2$ is maintained). Note that, in S3060, it can be said that the CPU 71 functions as the control unit.

In S3100, in accordance with the master work machine $WM_0$ having reached the work end point $P0_Q$ in S3020, the slave work machines $WM_1$ and $WM_2$ are caused to travel to the work end points $P1_Q$ and $P2_Q$, while causing the master work machine $WM_0$ to recede to a predetermined position. The receding position of the master work machine $WM_0$ may be any position where the slave work machines $WM_1$ and $WM_2$ do not interfere with the master work machine $WM_0$, and may be outside the work region WR1. Note that, in S3100, it can be said that the CPU 71 functions as the control unit.

According to the present flowchart, the work machines $WM_0$, $WM_1$, and $WM_2$ are subject to the travel control so that the slave work machines $WM_1$ and $WM_2$ respectively follow the rear lateral sides of the master work machine $WM_0$. In the present embodiment, the slave work machine $WM_1$ may follow one of the rear lateral sides (a rear left side) of the master work machine $WM_0$, and the slave work machine $WM_2$ may follow the other of the rear lateral sides (a rear right side) of the master work machine $WM_0$. However, as another embodiment, both of the slave work machines $WM_1$ and $WM_2$ may follow either one or the other of the rear lateral sides of the master work machine $WM_0$. As still another embodiment, the slave work machine $WM_1$ may precede one of the front lateral sides (a front left side) of the master work machine $WM_0$, and the slave work machine $WM_2$ may precede the other of the front lateral sides (a front right side), or both of the slave work machines $WM_1$ and $WM_2$ may precede either one or the other of the front lateral sides of the master work machine $WM_0$. Further, the relative positions of the slave work machines $WM_1$ and $WM_2$ with respect to the master work machine $WM_0$ may be changed (for example, between a first half route and a second half route,) in some of the plurality of reciprocation routes $r1\_1$ or the like.

(Method for Travel Control for Slave Work Machine)

As described above, the slave work machines $WM_1$ and $WM_2$ do not include the self-work machine position specifying unit 4 or the another work machine detection unit 5, and travel, based on the travel instruction that has been received from the master work machine $WM_0$. For this reason, in the flowchart of FIG. 5, the master work machine $WM_0$ is capable of correcting the travel instruction to be output to the slave work machines $WM_1$ and $WM_2$, based on actual travel modes of the slave work machines $WM_1$ and $WM_2$.

As described above, the master work machine $WM_0$ is capable of acquiring the position coordinates of the master work machine $WM_0$ on the map information inf1 by use of the GPS sensor that is the self-work machine position specifying unit 4, and its result is associated on the map information inf1. In addition, the master work machine $WM_0$ is capable of acquiring a relative position (a distance and a direction) of each of the slave work machines $WM_1$ and $WM_2$ with respect to the master work machine $WM_0$ by use of a distance measuring device, which is the another work machine detection unit 5, and the individual actual positions of the slave work machines $WM_1$ and $WM_2$ are respectively specified, based on the relative positions with respect to the master work machine $WM_0$. That is, it is possible to calculate the individual position coordinates of the slave work machines $WM_1$ and $WM_2$, based on a specification result of the self-work machine position specifying unit 4 and a detection result of the another work machine detection unit 5. From this viewpoint, it can be said that the self-work machine position specifying unit 4 and the another work machine detection unit 5 function as a specifying unit for specifying individual actual positions of the slave work machines $WM_1$ and $WM_2$.

In the above-described manner, the travel instruction output from the master work machine $WM_0$ to the slave work machine $WM_1$ can be corrected, based on the actual position coordinates of the slave work machine $WM_1$, and the travel instruction output from the master work machine $WM_0$ to the slave work machine $WM_2$ can be corrected, based on the actual position coordinates of the slave work machine $WM_2$.

In the present embodiment, it is assumed that each of the slave work machines $WM_1$ and $WM_2$ is provided with a predetermined mark, and in the present embodiment, is provided with a QR code (registered trademark). Accordingly, the master work machine $WM_0$ is capable of individually identifying the slave work machines $WM_1$ and $WM_2$. For example, it becomes possible to prevent the travel instruction output to the slave work machines $WM_1$ and $WM_2$ and the correction contents from being complicated.

The marks provided in the slave work machines $WM_1$ and $WM_2$ may be any marks capable of individually identifying them. Instead of the QR code, a character, a number, a symbol, a color given to each of them, or a combination thereof may be used.

(Travel Route for Work Regions Having Other Outer Shapes)

In the above-described embodiment, for facilitating the understanding, the work region WR1 having a rectangular outer shape in a plan view has been given as an example. However, it is likely that the work region WR1 has various type of outer shapes. Also in such cases, the individual travel routes R1 can be set, based on the flowchart of FIG. 3, to form the reciprocation route $r1\_1$ and the like for the corresponding work machines WM to reciprocate between one side and the other side in the work region WR1.

First Example: Work Region Having any Quadrangular Shape

Figure 7:
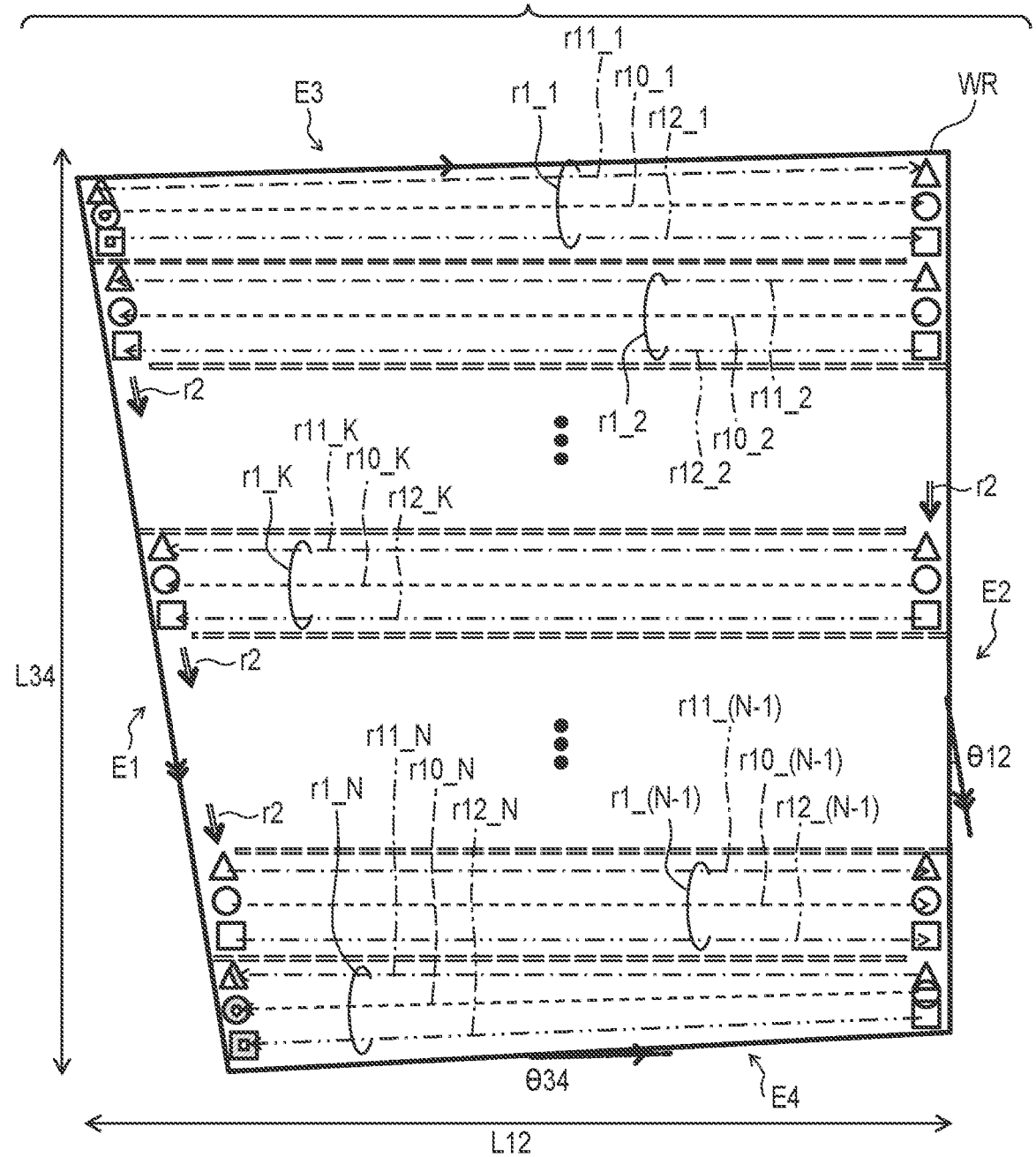
FIG. 7 is a diagram illustrating another example of the travel route that has been set in the work region.

FIG. 7 illustrates the work region WR1 according to a first example. In the present example, the side portions E1 and E2 facing each other in the work region WR1 are not parallel to each other, and other side portions E3 and E4 connecting them are not parallel to each other.

It is assumed that an angle formed by the side portions E1 and E2 is an angle θ12 (<90 degrees), and an angle formed by the side portions E3 and E4 is an angle θ34 (<90 degrees), and θ12>θ34 is established. In this case, from the viewpoint of improving the work efficiency, the reciprocation route $r1\_1$ and the like are desirably set so that its directions are along the side portions E3 and E4, but may be set so that its directions are along the side portions E1 and E2.

In addition, the distance between the side portions E1 and E2 is defined as a distance L12, the distance between the side portions E3 and E4 is defined as a distance L34, and L12<L34 is established. In this case, from the viewpoint of improving the work efficiency, the reciprocation route $r1\_1$ and the like are desirably set so that its directions are along the side portions E3 and E4, but may be set so that its directions are along the side portions E1 and E2.

In the present embodiment, N is an integer of 4 or more for N reciprocation routes (the reciprocation routes $r1\_1$, $r1\_2$, ..., $r1\_N$) included in the travel route R1. The reciprocation routes r1_2 to r1_(N−1) may be desirably set to be parallel to one another. In this situation, the reciprocation routes r10_K, r11_K, and r12_K are set to be parallel to one another, where K is any integer of 2 to (N−1).

On the other hand, the reciprocation routes r1_1 and r1_2 may be desirably set so that the directions are parallel to each other or are alternate with each other within a range of 20 degrees or smaller. In this situation, with respect to the reciprocation routes r10_2, r11_2, and r12_2, which are set to be parallel to one another, the reciprocation routes r10_1, r11_1, and r12_1 can be set to be alternate with each other within a range of 20 degrees or smaller. Incidentally, among the reciprocation routes r10_1, r11_1, and r12_1, one (here, the reciprocation route r12_1) closest to the reciprocation route r1_2 can be set to be parallel to the reciprocation route r1_2.

In addition, the reciprocation routes r1_(N−1) and r1_N may be desirably set so that the directions are parallel to each other or are alternate with each other within a range of 20 degrees or smaller. In this situation, with respect to the reciprocation routes r10_(N−1), r11_(N−1), and r12_(N−1), which are set to be parallel to one another, the reciprocation routes r10_N, r11_N, and r12_N can be set to be alternate with each other within a range of 20 degrees or smaller. Incidentally, among the reciprocation routes r10_N, r11_N, and r12_N, one (here, the reciprocation route r11_N) closest to the reciprocation route r1_2 can be set to be parallel to the reciprocation route r1_(N−1).

In addition, the turnaround route r2 is set along the side portion E1 or E2 for each of the master work machine $WM_0$, the slave work machine $WM_1$, and the slave work machine $WM_2$.

In the present example, the work widths (≤D1×3) of the plurality of work machines WM are different between the work start point $P_P$ side and an intermediate point $P_R$ side on the reciprocation route r1_1, and are different between the work end point $P_Q$ side and the intermediate point $P_R$ side on the reciprocation route r1_N. In such a case, for example, there is a possibility that the plurality of work machines WM interfere with each other at the work start point $P_P$. For this reason, it would be sufficient if some or all of them to wait for the start of the work at the work start point $P_P$ at different timings.

According to the present example, even in the case where the work region WR1 has any quadrangular shape, the travel route R1 can be set, and the work efficiency in the work region WR1 can be improved.

Second Example: Work Region Having a Curved Line Shape

Figure 8:
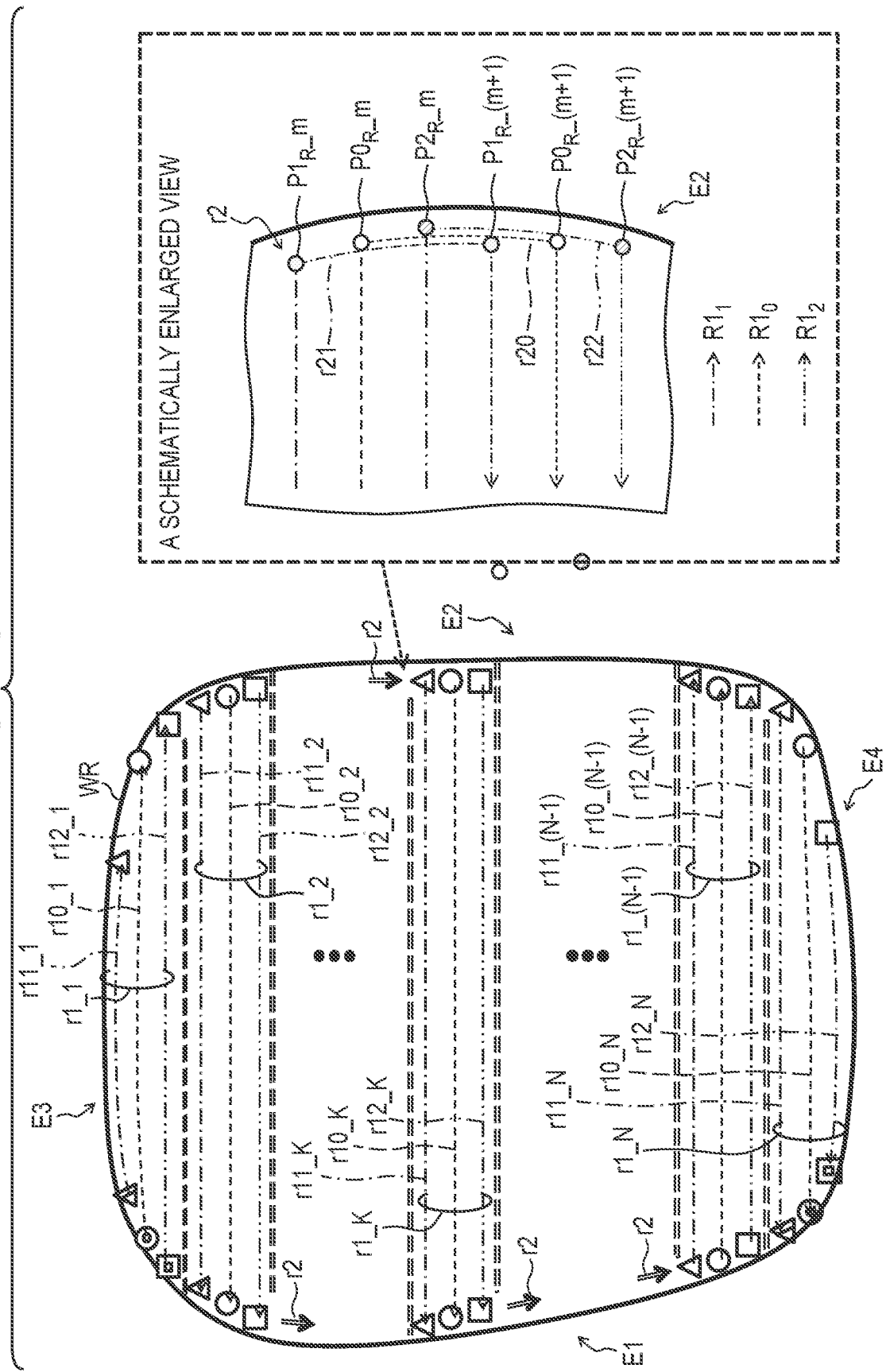
FIG. 8 is a diagram illustrating another example of the travel route that has been set in the work region.

FIG. 8 illustrates a work region WR1 according to a second example. In the present example, the outer edge portions of the work region WR1 exhibit curved lines. In such a case, an arithmetic process is performed on the work region WR1 as a quadrangular shape virtually having four corner portions, and thus it becomes possible to set the travel route R1. In the present example, four points Pa, Pb, Pc, and Pd are set as the above-described corner portions on the outer edge portion of the work region WR1. It would be sufficient if the points Pa, Pb, Pc, and Pd are set on the map information inf1 so that the flowchart of FIG. 3 becomes achievable.

An edge portion between the points Pa and Pb is associated with the side portion E1 (defined as the edge portion E1). An edge portion between the points Pc and Pd is associated with the side portion E2 (defined as the edge portion E2). An edge portion between the points Pa and Pc is associated with the side portion E3 (defined as the edge portion E3). An edge portion between the points Pb and Pd is associated with the side portion E4 (defined as the edge portion E4).

In other words, two (here, the points Pa and Pb) of the four points Pa, Pb, Pc, and Pd that have been selected on the outer edge portions of the work region WR1 correspond to both ends of a curved line on one side of the work region WR1. In addition, the other two (here, the points Pc and Pd) correspond to both ends of a curved line on the other side of the work region WR1.

Here, a travel route connecting between two intermediate points $P_R$ adjacent to each other at each of the edge portions E1 and E2, that is, a travel route connecting N reciprocation routes (the reciprocation routes r1_1, r1_2, . . . , r1_N) is defined as the turnaround route r2. In the drawing, the turnaround routes r2 corresponding to the master work machine $WM_0$, the slave work machine $WM_1$, and the slave work machine $WM_2$ are respectively indicated as turnaround routes r20, r21, and r22. In this situation, each of the turnaround routes r20, r21, and r22 is set along the curved line of the edge portion E1 or E2 (although a schematically enlarged view of the edge portion E2 is illustrated in the drawing, the same applies to the edge portion E1).

On the other hand, the reciprocation route r1_1 is set along the curved line of the edge portion E3. In this case, the reciprocation routes r10_1, r11_1, and r12_1 are set to be closer to one another, as the reciprocation routes are closer to the point Pa or Pc, and to be more separated from one another, as the reciprocation routes are farther from the points Pa and Pc. That is, the reciprocation routes r10_1, r11_1, and r12_1 respectively draw curved lines. Incidentally, among the reciprocation routes r10_1, r11_1, and r12_1, one (here, the reciprocation route r12_1) closest to the reciprocation route r1_2 has a relatively small curvature, and can be set to be substantially parallel to the reciprocation route r1_2.

Similarly, the reciprocation route r1_N is set along the curved line of the edge portion E4. In this case, the reciprocation routes r10_N, r11_N, and r12_N are set to be closer to one another, as the reciprocation routes are closer to the point Pb or Pd, and to be more separated from one another, as the reciprocation routes are farther from the points Pb and Pd. That is, the reciprocation routes r10_N, r11_N, and r12_N respectively draw curved lines. Incidentally, among the reciprocation routes r10_N, r11_N, and r12_N, one (here, the reciprocation route r11_N) closest to the reciprocation route r1_(N−1) has a relatively small curvature, and can be set to be substantially parallel to the reciprocation route r1_(N−1).

In the present example, the slave work machine $WM_1$ travels along the outer edge portions E3 and E2 of the curved lines from the work start point $P_P$ through the first intermediate point $P_R\_1$ to the second intermediate point $P_R\_2$. Similarly, the slave work machine $WM_2$ travels along the outer edge portions E2 and E4 of the curved lines while traveling from the next-to-last intermediate point $P_R\_((N−1)\times2−1)$ through the last intermediate point $P_R\_((N−1)\times2)$ to reach the work end point $P_Q$.

Further, the reciprocation routes r1_2 to r1_(N−1) are set similarly to the above-described first example. That is, the reciprocation routes r10_K, r11_K, and r12_K respectively draw straight lines with K as an integer of 2 to (N−1).

According to the present example, even in the case where the work region WR1 has a shape with the curved lines, the travel route R1 can be set relatively easily, and the work efficiency in the work region WR1 can be improved.

Application Examples

Some or all of the above-described first to second examples can be combined together, and the individual travel route R1 can be set, even in a case where the work region WR1 has a polygonal outer shape or a part or all of the side portions each have a curved line. For example, in a case where the work region WR1 has a polygonal outer shape, two sides facing each other and relatively parallel to each other are selected from the plurality of side portions, and the reciprocation route r1_1 for reciprocating between the sides is set. Thus, the travel route R1 can be appropriately set. In this situation, the work start point $P_P$, the work end point $P_Q$, and the intermediate point $P_R$ do not have to be set at a corner portion. Similarly, in a case where the entire outer shape of the work region WR1 is a curved line, two parts facing each other and relatively parallel to each other are selected from its peripheral edge part, and the reciprocation route r1_1 for reciprocating between them is set. Thus, the travel route R1 can be appropriately set.

Therefore, according to the above embodiments, regarding the work region WR1 having any outer shape, the travel route R1 can be set so as to form the reciprocation route r1_1 and the like for the corresponding work machines WM to reciprocate between one side and the other side of the work region WR1. According to the travel route R1 that has been set in this manner, the work in the work region WR1 having any outer shape can be conducted by the plurality of work machines WM in cooperation, and the work efficiency can be improved.

(Others)

As described above, the function of the system controller 7 is achievable by either hardware or software. Therefore, in each embodiment, the content of each step is achieved by the CPU 71. However, the function of the system controller 7 may be achieved by a processing circuit. In this case, the system controller 7 may include a circuit unit that implements each step, and for example, may be configured as a system in package (SIP), or may be configured by mounting a plurality of semiconductor packages on a mounting board.

Further, in an embodiment, the system controller 7 is provided in the master work machine $WM_0$. However, as another embodiment, the system controller 7 may be provided outside the master work machine $WM_0$. For example, the system controller 7 may be provided at a place away from the work region WR1. In this case, it would be sufficient if the master work machine $WM_0$ is configured to be communicable with the system controller 7 through a network, conducts travel control for the main body of the master work machine $WM_0$, based on the above-described travel route R1 that has been received on communication, and outputs a travel instruction to the slave work machines $WM_1$ and $WM_2$.

In the above description, each element has been given a name related to its functional aspect for facilitating the understanding. Meanwhile, each element is not limited to one having, as a main function, the function described in the embodiment, and may be one having the function as an auxiliary function. Therefore, each element is not strictly limited to the expression, and such an expression can be replaced with a similar expression. For the same purpose, the expression "apparatus" may be replaced with "unit", "component", "piece", "member", "structure", "assembly", or the like, or may be omitted.

Summary of Embodiments

Some features of the embodiments are summarized from the viewpoint of the master work machine $WM_0$ as follows.

A first aspect relates to a work machine (for example, WM), and the work machine is a work machine capable of conducting a work in a work region (for example, WR1), with a self-work machine being as a master work machine (for example, $WM_0$) and another work machine being as a slave work machine (for example, $WM_1$, $WM_2$), in cooperation with the slave work machine, by outputting a travel instruction to the slave work machine, the work machine including:
  a setting unit (for example, S2010) configured to set a travel route (for example, R1) of each of the master work machine and the slave work machine on map information (for example, inf1);
  a control unit (for example, S1040) configured to conduct travel control for the self-work machine that is the master work machine, while outputting the travel instruction to the salve work machine, and configured to conduct the work in cooperation with the slave work machine; and
  a specifying unit (for example, 4, 5) configured to specify an actual position of the slave work machine, in which the control unit corrects the travel instruction, based on a difference between a position of the slave work machine on the map information on the travel route that has been set by the setting unit and the actual position of the slave work machine that has been specified by the specifying unit. Accordingly, it is possible to improve the work efficiency relatively easily in a system in which the plurality of work machines conduct the work in cooperation.

In a second aspect,
a GPS sensor (for example, 4) is further included. Accordingly, the first aspect described above is appropriately achievable.

In a third aspect,
the specifying unit associates a detection result of the GPS sensor on the map information, and specifies the actual position of the slave work machine, based on a relative position with respect to the self-work machine that is the master work machine. Accordingly, the second aspect described above is appropriately achievable.

In a fourth aspect,
a distance measuring device (for example, 5) configured to measure the relative position of the slave work machine with respect to the self-work machine that is the master work machine is further included, in which the specifying unit specifies the actual position of the slave work machine, based on a result of the distance measuring device. Accordingly, the third aspect described above is appropriately achievable.

In a fifth aspect,
the distance measuring device includes a camera. Accordingly, the fourth aspect described above is appropriately achievable.

In a sixth aspect,
the slave work machine is provided with a predetermined mark, and the specifying unit specifies the actual position of the slave work machine, based on the predetermined mark. Accordingly, the fifth aspect described above is appropriately achievable.

In a seventh aspect, the predetermined mark is a QR code. Accordingly, the sixth aspect described above is appropriately achievable.

In an eighth aspect, the distance measuring device includes at least one of a radar or a LiDAR. Accordingly, the fourth aspect described above is appropriately achievable.

In a ninth aspect, the slave work machine is provided with no GPS sensor, and the control unit outputs the travel instruction to the slave work machine. Accordingly, the first aspect described above is appropriately achievable.

In a tenth aspect, the control unit conducts the travel control for the self-work machine that is the master work machine, while outputting the travel instruction to the slave work machine such that the slave work machine follows a rear lateral side of the master work machine, or the slave work machine precedes a front lateral side of the master work machine. Accordingly, the first aspect described above is appropriately achievable.

In addition, some other features of the embodiments are summarized from the viewpoint of the system controller 7 as an arithmetic device to be mountable on the master work machine $WM_0$ as follows.

A first aspect relates to an arithmetic device (for example, 7), the arithmetic device is an arithmetic device configured to perform an arithmetic process on a travel route for each of a plurality of work machines (for example, WM) capable of conducting a work in a work region (for example, WR1), the arithmetic device including:

an acquisition unit (for example, S2000) configured to acquire map information (for example, inf1) of the work region; and a setting unit (for example, S2010) configured to set, for each of the plurality of work machines, a work start point (for example, $P_P$), a work end point (for example, $P_Q$), and at least one intermediate point (for example, $P_R$) between the work start point and the work end point on an outer edge portion of the work region, and configured to set, on the map information, the travel route (for example, R1) from the work start point to the work end point to pass through the at least one intermediate point, in which the travel route has a predetermined width (for example, D1), and a plurality of travel routes respectively corresponding to the plurality of work machines enclose the work region with the predetermined width. Accordingly, it is possible to improve the work efficiency relatively easily in a system in which the plurality of work machines conduct the work in cooperation.

In a second aspect, one of the plurality of work machines is set as a master work machine (for example, $WM_0$), and at least another one of the plurality of work machines is set as a slave work machine (for example, $WM_1$, $WM_2$), the arithmetic device further including a control unit (for example, S1040) configured to conduct travel control for the master work machine and the slave work machine such that the slave work machine follows a rear lateral side of the master work machine, or the slave work machine precedes a front lateral side of the master work machine. Accordingly, the first aspect described above is appropriately achievable.

In a third aspect, the setting unit sets each of a plurality of travel routes such that each of the plurality of travel routes includes a reciprocation route (for example, r1_1 or the like) for each of the plurality of work machines to reciprocate between one side and another side of the work region, and the at least one intermediate point corresponds to a turnaround point of the reciprocation route. Accordingly, the second aspect described above is appropriately achievable.

In a fourth aspect, the setting unit sets each of the plurality of travel routes such that directions of the reciprocation route are parallel to each other. Accordingly, the third aspect described above is appropriately achievable.

In a fifth aspect, each of the plurality of travel routes includes a first reciprocation route to an Nth reciprocation route, where N is an integer equal to or greater than 3, and the setting unit sets each of the plurality of travel routes such that the first reciprocation route and the Nth reciprocation route respectively form curved lines, and a Kth reciprocation route forms a straight line, where K is any integer equal to or greater than 2 to equal to or smaller than N−1. Accordingly, the third aspect described above is appropriately achievable.

In a sixth aspect, each of the plurality of travel routes includes a first reciprocation route to an Nth reciprocation route, where N is an integer equal to or greater than 4, and the setting unit sets each of the plurality of travel routes such that directions of the first reciprocation route and the second reciprocation route are parallel to each other or are alternate with each other within a range equal to or smaller than 20 degrees, directions of an (N−1)th reciprocation route and the Nth reciprocation route are parallel to each other or are alternate with each other within the range equal to or smaller than 20 degrees, and the second reciprocation route to the (N−1)th reciprocation route are parallel to each other. Accordingly, the third aspect described above is appropriately achievable.

In a seventh aspect, the setting unit sets such that the directions of the first reciprocation route of the plurality of work machines are alternate with each other within the range equal to or smaller than 20 degrees, the directions of the Nth reciprocation route of the plurality of work machines are alternate with each other within the range equal to or smaller than 20 degrees, and a Kth reciprocation route of the plurality of work machines is parallel to each other, where K is any integer equal to or greater than 2 to equal to or smaller than N−1. Accordingly, the sixth aspect described above is appropriately achievable.

In an eighth aspect, the outer edge portion of each of the one side and the another side of the work region exhibits a curved line, each of the plurality of travel routes includes a turnaround route (for example, r2) connecting between the reciprocation routes, and the setting unit sets each of the plurality of travel routes such that the turnaround route is formed along the curved line. Accordingly, the third aspect described above is appropriately achievable.

In a ninth aspect, the setting unit selects four points (for example, Pa, Pb, Pc, Pd) on the outer edge portion of the work region, and sets the four points on the map information, two (for example, Pa, Pb) of the four points respectively corresponding to both ends of the curved line on the one side, the other two (for example, Pc, Pd) of the four points respectively corresponding to both ends of the curved line on the another side. Accordingly, the eighth aspect described above is appropriately achievable.

In a tenth aspect, the arithmetic device (for example, 7) of one of the first to ninth aspects;

a travel unit (for example, 1) configured to cause a vehicle body to travel;

a work unit (for example, 2) configured to conduct a work; and a drive unit (for example, 3) configured to drive the travel unit and the work unit are included. That is, the arithmetic device described above is applicable to a typical work machine.

The invention is not limited to the foregoing embodiments, and various variations/changes are possible within the spirit of the invention.

What is claimed is:

1. A master work machine to conduct work in a work region in cooperation with one or more slave work machines, comprising:
   an arithmetic device, and
   each of the master work machine and the one or more slave work machines comprising:
      a work unit configured to conduct the work, having a predetermined work width; and
      a travel unit configured to cause its vehicle body to travel, and the arithmetic device comprising:
      an acquisition unit configured to acquire map information indicating a shape of the work region; and
      a setting unit configured to:
      set, on the map information, for each of the master work machine and the one or more slave work machines, a work start point, a work end point, and at least one intermediate point between the work start point and the work end point on a side edge portion inside of the work region, and
      set, on the map information, for each of the master work machine and the one or more slave work machines, a travel route from the work start point to the work end point to pass through the at least one intermediate point,
   wherein the setting unit sets, on the map information, a plurality of travel routes corresponding to the master work machine and the one or more slave work machines, such that an entire area described by the work width centered on each of the plurality of travel routes enclose a whole of the work region, and
   the setting unit sets each of a plurality of travel routes such that each of the plurality of travel routes includes a reciprocation route for each of the plurality of work machines to reciprocate between one side edge portion and another side edge portion inside of the work region, and
   the at least one intermediate point corresponds to a turnaround point of the reciprocation route.

2. The master work machine according to claim 1, wherein
   the arithmetic device further comprises a control unit configured to conduct travel control for the master work machine and the slave work machine such that the slave work machine follows a rear lateral side of the master work machine, or the slave work machine precedes a front lateral side of the master work machine.

3. The master work machine according to claim 1, wherein
   the setting unit sets each of the plurality of travel routes such that directions of the reciprocation route are parallel to each other.

4. The master work machine according to claim 1, wherein
   each of the plurality of travel routes includes a first reciprocation route to an Nth reciprocation route, where N is an integer equal to or greater than 3, and
   the setting unit sets each of the plurality of travel routes such that
   the first reciprocation route and the Nth reciprocation route respectively form curved lines, and
   a Kth reciprocation route forms a straight line, where K is any integer equal to or greater than 2 to equal to or smaller than N−1.

5. The master work machine according to claim 1, wherein
   each of the plurality of travel routes includes a first reciprocation route to an Nth reciprocation route, where N is an integer equal to or greater than 4, and
   the setting unit sets each of the plurality of travel routes such that
   directions of the first reciprocation route and the second reciprocation route are parallel to each other or are alternate with each other within a range equal to or smaller than 20 degrees,
   directions of an (N−1)th reciprocation route and the Nth reciprocation route are parallel to each other or are alternate with each other within the range equal to or smaller than 20 degrees, and
   the second reciprocation route to the (N−1)th reciprocation route are parallel to each other.

6. The master work machine according to claim 5, wherein
   the setting unit sets each of the plurality of travel routes such that
   the directions of the first reciprocation route of the plurality of work machines are alternate with each other within the range equal to or smaller than 20 degrees,
   the directions of the Nth reciprocation route of the plurality of work machines are alternate with each other within the range equal to or smaller than 20 degrees, and
   Kth reciprocation routes of the plurality of work machines are parallel to each other, where K is any integer equal to or greater than 2 to equal to or smaller than N−1.

7. The master work machine according to claim 1, wherein
   each of the one side edge portion and the another side edge portion inside of the work region exhibits a curved line,
   each of the plurality of travel routes includes a turnaround route connecting between the reciprocation routes, and the setting unit sets each of the plurality of travel routes such that the turnaround route is formed along the curved line.

\* \* \* \* \*